(12) United States Patent
Jerems et al.

(10) Patent No.: US 7,406,884 B2
(45) Date of Patent: *Aug. 5, 2008

(54) DEVICE FOR DETERMINING A STEERING ANGLE AND A TORQUE THAT IS EXERTED ON A STEERING SHAFT

(75) Inventors: Frank Jerems, Loechgau (DE); Dirk Rachui, Bietigheim-Bissingen (DE); Ekkehart Froehlich, Nordheim (DE); Christian Ruetz, Ludwigsburg (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 48 days.

This patent is subject to a terminal disclaimer.

(21) Appl. No.: 10/586,051

(22) PCT Filed: Jan. 12, 2005

(86) PCT No.: PCT/EP2005/000201

§ 371 (c)(1),
(2), (4) Date: Jul. 14, 2006

(87) PCT Pub. No.: WO2005/068962

PCT Pub. Date: Jul. 28, 2005

(65) Prior Publication Data

US 2007/0157740 A1    Jul. 12, 2007

(30) Foreign Application Priority Data

| Jan. 20, 2004 | (DE) | .................. 20 2004 020 417 U |
| Jan. 20, 2004 | (DE) | .................. 20 2004 020 418 U |
| Jan. 20, 2004 | (DE) | .................. 20 2004 020 419 U |
| May 5, 2004 | (DE) | ...................... 10 2004 023 801 |

(51) Int. Cl.
*G01L 3/00* (2006.01)
(52) U.S. Cl. ............................... 73/862.331

(58) Field of Classification Search .................
73/862.331–862.338
See application file for complete search history.

(56) References Cited

U.S. PATENT DOCUMENTS 6,018,691 A    1/2000 Yamamoto et al.
6,201,389 B1 *    3/2001 Apel et al. ............... 324/207.2

(Continued)

FOREIGN PATENT DOCUMENTS

DE    44 09 892    9/1995

(Continued)

*Primary Examiner*—Edward Lefkowitz
*Assistant Examiner*—Octavia Davis
(74) *Attorney, Agent, or Firm*—Paul Vincent

(57) ABSTRACT

A device determines a torque that is exerted on a shaft, the shaft having a first shaft section and a second shaft section, the two shaft sections being rotatable in relation to one another. The device comprise a multi-pole magnetic ring and a stator support that is fixed to the second shaft section. Two stator elements are fixed to the stator support and each stator element has fingers that project in an axial or radial direction, are uniformly distributed at least over part of the circumference and are interspaced by gaps. The magnetic ring is situated between the fingers of one stator element and the fingers of the other stator element. A second magnetic ring is located on one of the two shaft sections and a magnetic sensor is mounted on one of the two shaft sections.

11 Claims, 4 Drawing Sheets

U.S. PATENT DOCUMENTS

| | | |
|---|---|---|
| 6,860,159 B2 * | 3/2005 | Jin et al. ................. 73/862.331 |
| 6,912,923 B2 * | 7/2005 | Froehlich et al. ........ 73/862.333 |
| 7,021,160 B2 * | 4/2006 | Pattok et al. ........... 73/862.332 |
| 2003/0209087 A1 | 11/2003 | Nakane et al. |
| 2003/0214284 A1 | 11/2003 | Okumura |
| 2003/0218458 A1 | 11/2003 | Seger |

FOREIGN PATENT DOCUMENTS

| | | |
|---|---|---|
| DE | 195 06 938 | 8/1996 |
| DE | 195 34 995 | 3/1997 |
| DE | 197 12 869 | 10/1998 |
| DE | 198 18 799 | 6/1999 |
| DE | 197 47 638 | 7/1999 |
| DE | 199 00 330 | 7/1999 |
| DE | 199 08 522 | 9/1999 |
| DE | 198 20 014 | 11/1999 |
| DE | 199 36 211 | 2/2000 |
| DE | 199 36 246 | 2/2001 |
| DE | 100 60 287 | 6/2001 |
| DE | 199 58 504 | 6/2001 |
| DE | 101 37 098 | 2/2002 |
| DE | 100 41 096 | 3/2002 |
| DE | 100 48 579 | 4/2002 |
| DE | 101 34 804 | 4/2002 |
| DE | 101 10 785 | 9/2002 |
| DE | 102 22 118 | 11/2002 |
| DE | 102 10 372 | 9/2003 |
| JP | 11 072352 | 3/1999 |
| JP | 2002 168651 | 6/2002 |
| WO | WO 02/071019 | 9/2002 |

* cited by examiner

DEVICE FOR DETERMINING A STEERING ANGLE AND A TORQUE THAT IS EXERTED ON A STEERING SHAFT True Translation of PCT/EP2005/000201 as filed on Jan. 12, 2005.

This application is the national stage of PCT/EP2005/000201 filed on Jan. 12, 2005 and also claims Paris Convention priority of DE 20 2004 020 418.5 filed on Jan. 20, 2004, DE 20 2004 020 419.3 filed on Jan. 20, 2004, DE 20 2004 020 417.7 filed on Jan. 20, 2004, and DE 10 2004 023 801.4 filed on May 5, 2004,

BACKGROUND OF THE INVENTION

The invention concerns a device for determining a torque exerted on a shaft, wherein the shaft comprises a first shaft section and a second shaft section, the two shaft sections being rotatable relative to each other, and with a multi-pole magnetic ring which surrounds the first shaft section and is connected thereto, and a stator holder mounted to the second shaft section, wherein two stator elements are mounted to the stator holder, each stator element comprising fingers which project in an axially or radially outward direction, are uniformly distributed over at least part of the periphery, and are interspaced by gaps, wherein the fingers of one stator element and the fingers of the other stator element are associated with the magnetic ring.

The steering angle is conventionally detected by a code disc and an optical sensor scanning the code disc, wherein the optical sensor is stationary and the code disc is fixed to the steering shaft or vice versa.

The increased use of control systems for controlling the drive dynamics of vehicles has considerably increased the importance of steering angle sensors. These sensors generate a signal which characterizes the steering angle or the change in steering angle of a vehicle. Towards this end, an encoding element, in particular a code disc, is rigidly connected to the steering shaft. The code disc is associated with an optical sensor which is fixed relative to the chassis or steering shaft and which can read the code of the code disc. Markings are thereby disposed on the disc, e.g. in the form of lines or notches, which are scanned. The optical sensor may consist of a light diode (DE 199 36 245 A1), an optical fiber element and a scanning unit comprising several light receivers. The digital scanning principle is characterized by high reliability.

Further devices for measuring the steering angle are disclosed in DE 101 10 785 A1, DE 100 41 095 A1, DE 101 42 448 A1, WO 99 39 169 A1 which are optically operated, DE 199 41 464 A1, which is operated inductively, and DE 197 47 638 C1, DE 199 00 330 A1, DE 195 06 938 A1. DE 100 36 281 A1, WO 2002 071 019 A1 and DE 102 22 118 A1 which are operated magnetically. Optical methods are less suitable for application in the engine compartment, since higher temperatures, oil, fat, and dirt may disturb the optical system.

Devices of this type can determine the absolute steering angle, the steering direction, the steering speed and steering acceleration with relatively high precision, however, this data is insufficient e.g. for an electromechanical steering aid (EPAS). Moreover, the direction and size of the steering torque are required.

All conventional optical methods have the property that the accuracy of measurement of the differential angle between input and output shafts of a torsion piece, required to measure the torque, must be less than 0.05°. This is a problem for imaging optics, since the measurement of the position of structural edges must be much more precise due to direct optical imaging on the detector than the separation between the pixels of the optical sensor arrays. Measurement of the torque at both ends of a torsion piece using optical sensors is known e.g. from WO 99 09 385 A1. Scanning of a pattern on an encoder disc using optical means is disclosed e.g. in EP 0 777 851 A1.

The above-mentioned analog optical methods are less suitable for measuring small angles of rotation in steering systems for determining the torque, since they are less robust. As mentioned above, when the sensor is used on a steering gear in the engine compartment, there is the danger that the high-resolution analog optical system is disturbed by the prevailing higher temperatures and the presence of oil, fat and dust.

Optical sensors which are digitally operated with low resolution are suited for use in the engine compartment. Analog optical sensors with high resolution seem to be less suitable.

Magnetic methods for torque measurement are usually operated with magnetic multi-pole wheels and magnetoresistive sensors. The magnetic field sensor detects the relative position of the magnetic poles (DE 198 28 513 A1). This transforms the small mechanical turning angle into a large electric signal change to achieve high measuring precision.

DE 102 30 347 A1 discloses a device for measuring the steering angle and torque, which utilizes the magnetic measurement of the Hall sensor principle.

It is therefore the underlying purpose of the invention to further develop a device of the above-mentioned type in such a manner that the steering information required for ESP (electronic stability program) and EPS (electric power steering) can be reliably determined by one single device at little expense.

SUMMARY OF THE INVENTION

This object is achieved in accordance with the invention with a device of the above-mentioned type in that a second magnetic ring is disposed on one of the two shaft sections, this magnetic ring being associated with at least one magnetic sensor.

The inventive device can magnetically measure the absolute angle of a steering shaft and at the same time the torque exerted on the steering shaft. This has the essential advantage that optical methods can be avoided, such that soiling and influences by oil, fat, and temperature have substantially less effect on the measuring result.

The inventive device can measure or calculate not only the torque and the absolute steering angle but also the steering speed and steering acceleration. The signals may thereby be further processed in analog or digital form and/or be correspondingly supplied to the control devices in a vehicle.

In a further development, the second magnetic ring is a multi-pole magnetic ring. The accuracy of the steering angle can be adjusted in dependence on the number of magnetic poles disposed about the periphery of the magnetic ring. One embodiment in accordance with the invention comprises two magnetic tracks having a different number of magnetic poles in order to increase the precision. Each magnetic track is associated with a sensor, such that an absolute steering angle can be measured from the varying sensor signals, with an accuracy of greater than 1°, in particular, between 0.03° and 0.5°. The design of such a magnetic ring is contained, in particular, in the priority applications the entire disclosures of which are hereby incorporated by reference.

The design is substantially simplified by providing one single board for receiving the sensors associated with the stator elements and the at least one sensor associated with the second magnetic ring. This board is disposed in a housing for protection. This is highly advantageous for maintenance or repair, since only the housing must be exchanged to replace all electronic components.

In one variant of the invention, the stator holder comprises an outer toothing and the outer toothing mates with a toothed wheel forming a transmission gear. This design permits detection of an absolute angle through several rotations, in particular through 1,480°, i.e. more than 4 rotations. Measurement is also effected electronically by providing the toothed wheel with a magnet, the magnet being associated with a sensor. The sensor is thereby also preferably disposed on the board.

In order to position the sensors in one plane, the axis of the toothed wheel is oriented orthogonally to the shaft. In one variant, the axis of the toothed wheel may also extend parallel to the shaft.

Further advantages, features and details of the invention can be extracted from the following description which describes in detail particularly preferred embodiments with reference to the drawing. The features shown in the drawing and mentioned in the claims and description may be essential to the invention either individual or collectively in arbitrary combination.

DESCRIPTION OF THE PREFERRED EMBODIMENT

Figure 1:
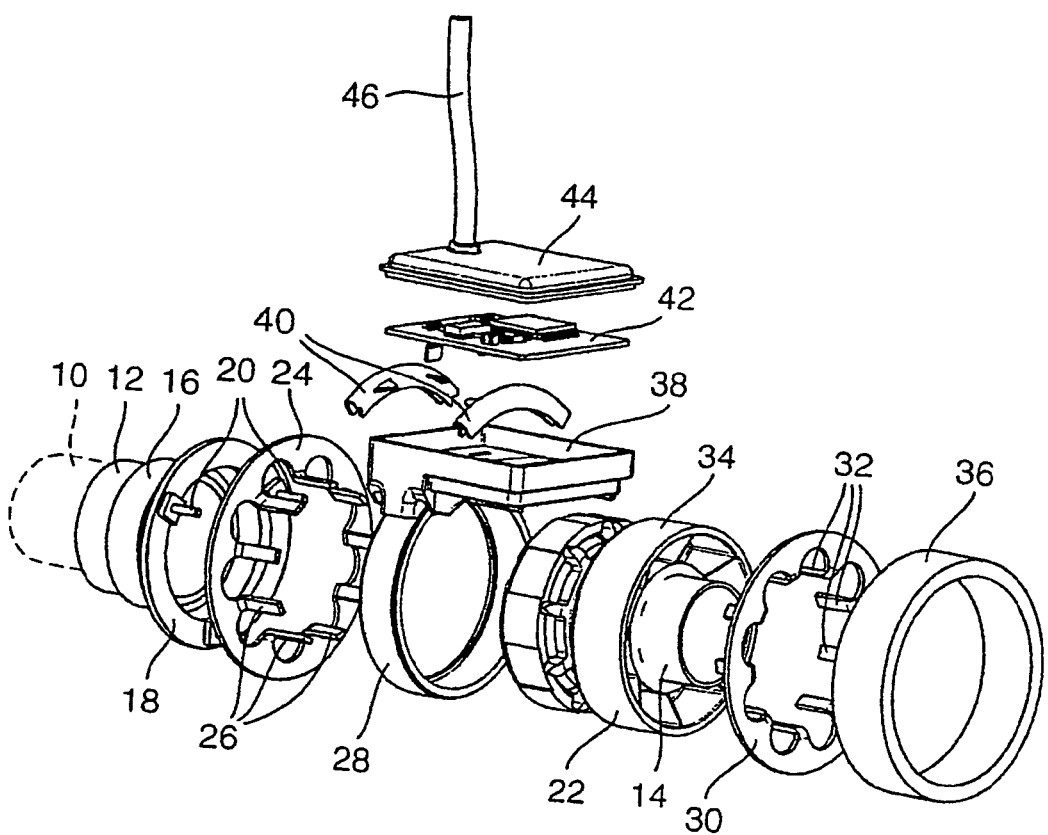
FIG. 1 shows an exploded view of a first embodiment of the inventive device.

FIG. 1 illustrates a steering shaft, designated with 10, of a vehicle, wherein two shaft sections 12 and 14 are shown, which are connected to each other via a torsion bar spring (not shown) such that the two shaft sections 12 and 14 can be turned relative to each other when a torque is exerted on the steering shaft 10. The coupling of the two shaft sections 12 and 14 is e.g. clearly shown in DE 102 56 322 A1, the entire disclosure of which is hereby incorporated by reference. The shaft section 12 is provided with a holder for a multi-pole magnetic ring 16 which surrounds the steering shaft 10.

FIG. 1 moreover shows a threaded ring 18 which is screwed to a stator holder 22 via three screws 20 which are distributed about the periphery and project in an axial direction. A first stator element 24 is provided between the threaded ring 18 and the stator holder 22, which comprises axially projecting fingers 26 which extend over the multi-pole magnetic ring 16. The magnetic ring 16 is thereby located radially within the fingers 26. A sliding ring 28 is also shown in which the stator holder 22 is disposed. The fingers 26 engage in the stator holder on one side, and the part of the stator holder 22 shown on the left hand side of FIG. 1 engages on the other side.

Figures 3A, 3B:
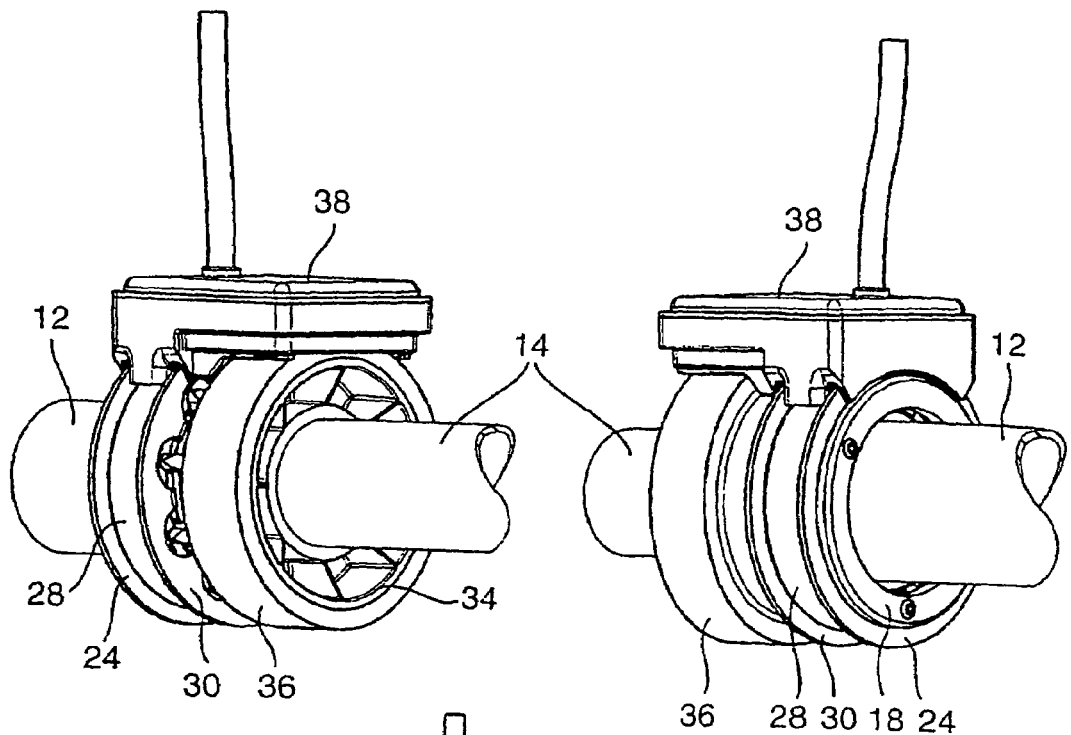
FIGS. 3a and 3b show the device according to FIGS. 1 and 2 in the assembled state.

FIG. 1 shows a second stator element 30 which is identical to the stator element 24 but is disposed such that its fingers 32 face towards the fingers 26. This stator element 30 is disposed on the stator holder 22 in such a manner that the fingers 32 project into the sliding ring 28 (also shown in FIGS. 3a and 3b). The stator elements 24 and 30 are also fixed via the stator holder 22.

The stator holder 22 has one support 34 for a two track multi-pole magnetic ring 36 which is axially pushed thereon. This is also clearly shown in FIG. 3a. The sliding ring 28 is part of a housing designated in total with 38, which accommodates flux concentrators 40 and a circuit board 42. The housing 38 is closed by a housing lid 44. A bundle of cables 46 is guided out of the housing.

Figure 2:
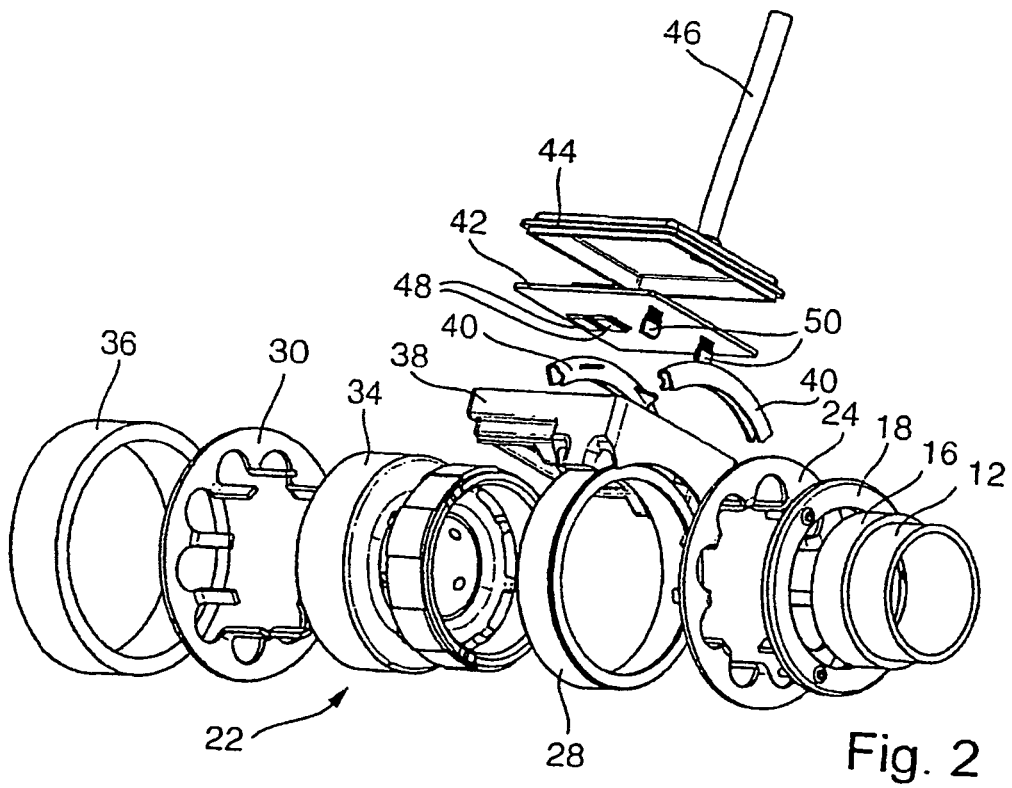
FIG. 2 shows the view of FIG. 1 from behind and below.

FIG. 2 clearly shows that sensors 48 and 50 are disposed on the lower side of the board 42, which are designed as Hall sensors. The sensors 48 are disposed next to each other in an axial direction and are associated with the two track multi-pole magnetic ring 36. The two sensors 50 are associated with the two flux concentrators 40 and detect rotation of the two stator elements 24 and 30 relative to the magnetic ring 16.

Figure 4:
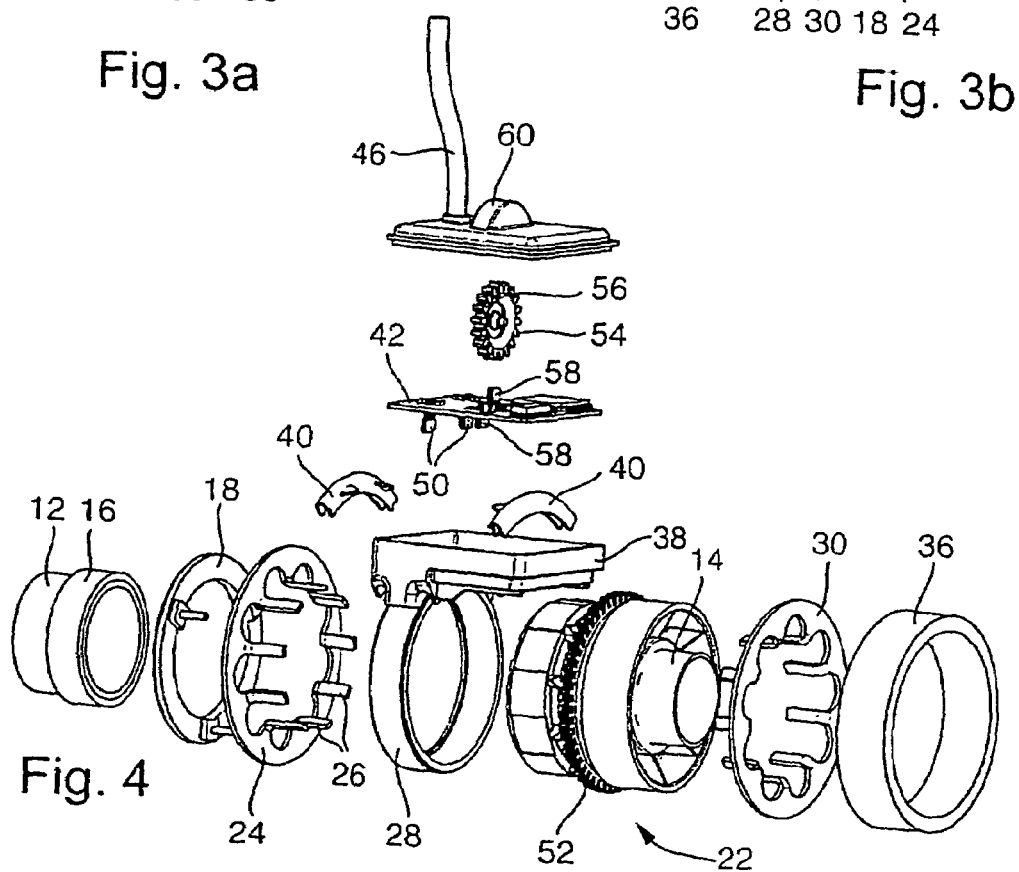
FIG. 4 shows an exploded view of a second embodiment of the inventive device.
Figures 5A, 5B:
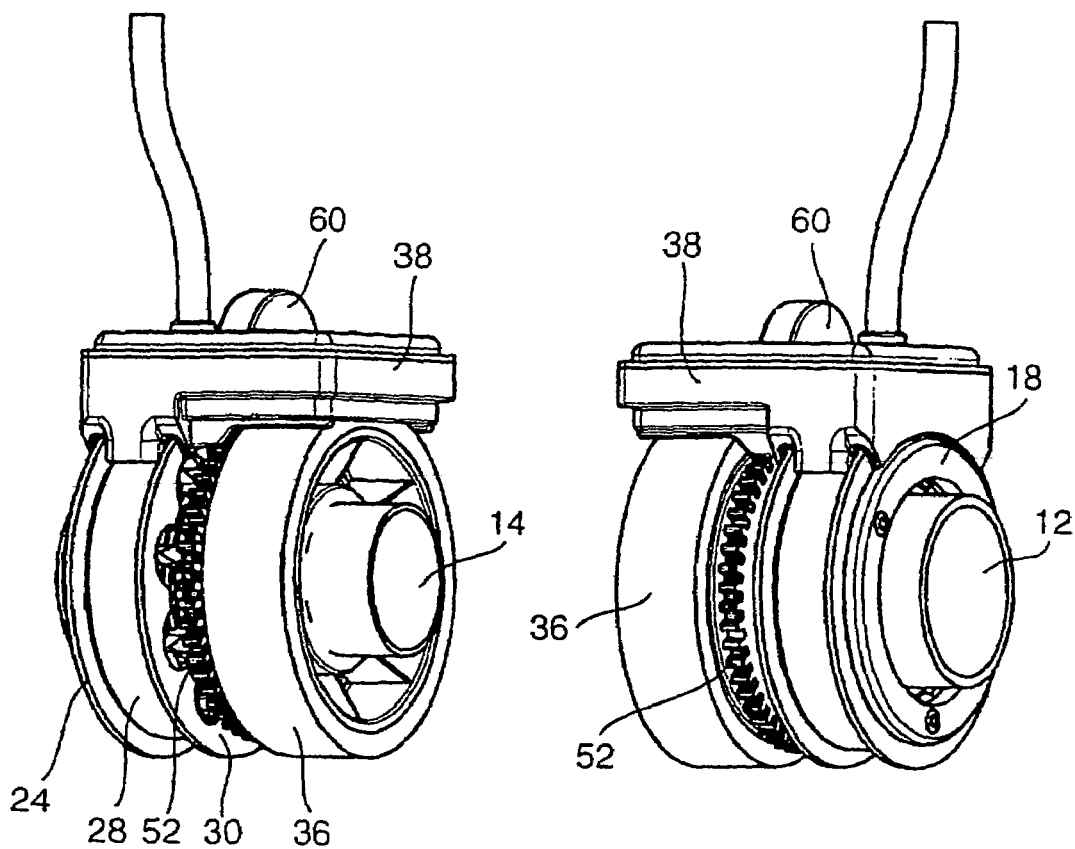
FIGS. 5a and 5b show the device of FIG. 4 in the assembled state.

FIGS. 4, 5a and 5b show a second embodiment, wherein the same components have the same reference numerals. In this embodiment, the stator holder 22 has an additional outer toothing 52 which mates with the toothed wheel 54 which is rotatably disposed in the housing 38. The toothed wheel 54 carries at least one magnet 56 which, in the embodiment shown, is associated with two sensors 58 which are also designed as Hall sensors. These sensors 58 are also disposed on the board 42.

The outer toothing 52 and the toothed wheel 54 form a transmission gear for detecting full rotations of the stator holder 22 and thus of the steering shaft 10. The outer toothing 52 and the toothed wheel 54 may also have the shape of a conical toothing such that the axis of the toothed wheel 54 is orthogonal to the axis of the steering shaft 10 and the sensors 58 can then be flatly disposed on the board 42. A cavity 60 in the housing 38 for receiving the toothed wheel 54 is then not required.

The stator elements 24 and 30 and the sensors 50 are designed to determine the exerted torque and the two track multi-pole magnetic ring 36 and sensors 38 are designed to determine the steering angle. The outer toothing 52, the toothed wheel 54 and the two sensors 58 detect the number of rotations. The entire system is based on magnetic measuring elements.

Figure 6:
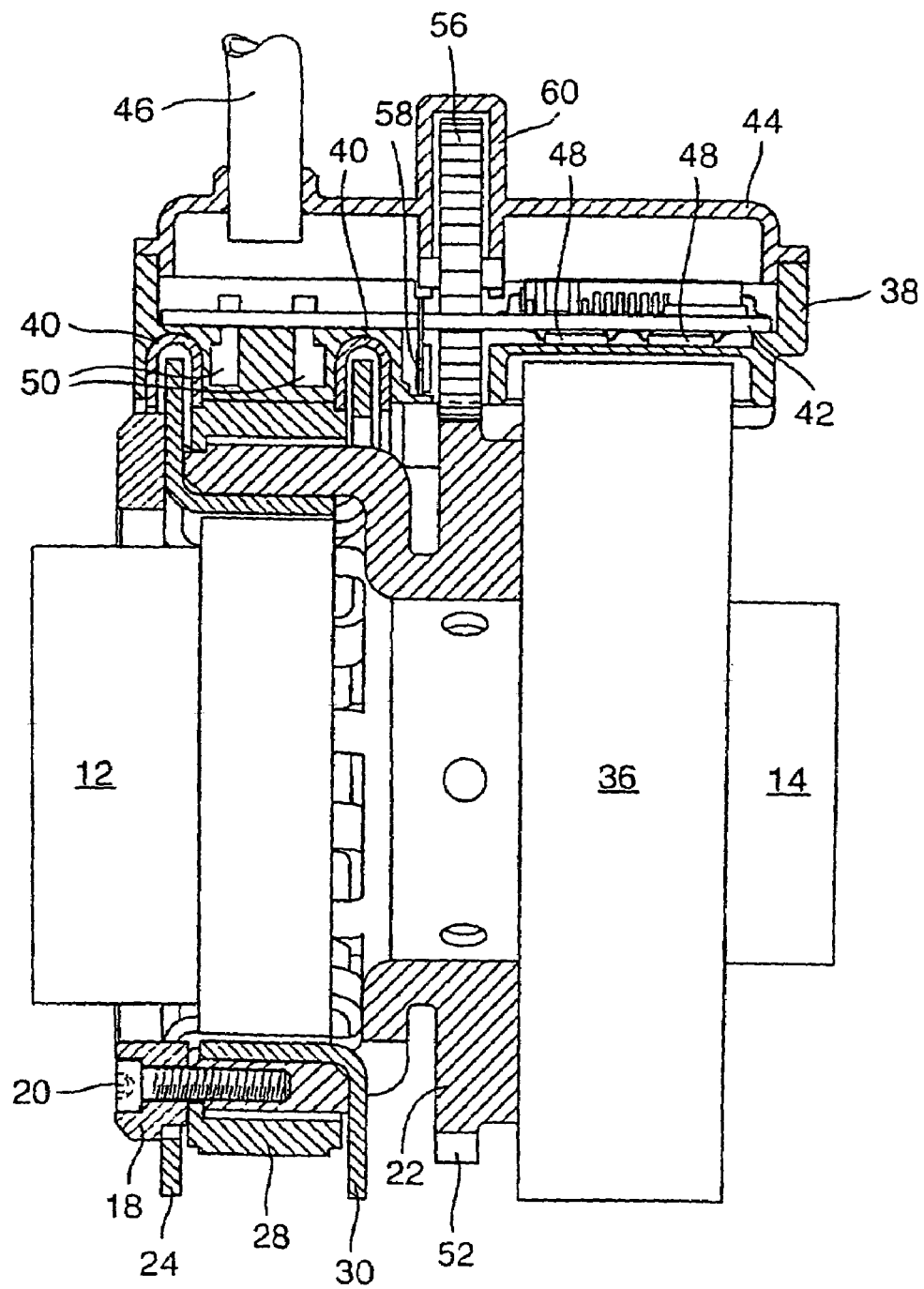
FIG. 6 shows a longitudinal section through the second embodiment of the inventive device.

FIG. 6 clearly shows the relative locations of the individual components.

We claim:

1. A device for determining a steering angle and a torque exerted on a shaft, the shaft having a first shaft section and a second shaft section, which can rotate relative to the first shaft section, the device comprising:

a first multi-pole magnetic ring disposed to surround the first shaft section and to cooperate therewith;

a stator holder mounted to the second shaft section;

a first stator element mounted to said stator holder, said first stator element having first fingers which project outwardly in an axial or radial direction and which are distributed substantially uniformly about at least a portion of a periphery of said first stator element, said first fingers defining interposed first gaps, wherein said first fingers communicate with said first magnetic ring;

a second stator element mounted to said stator holder, said second stator element having second fingers which project outwardly in an axial or radial direction and which are distributed substantially uniformly about at least a portion of a periphery of said second stator element, said second fingers defining interposed second gaps, wherein said second fingers communicate with said first magnetic ring;

a second magnetic ring disposed on one of the first and the second shaft sections; and at least one magnetic sensor communicating with said second magnetic ring.

2. The device of claim 1, wherein said second magnetic ring is a multi-pole magnetic ring.

3. The device of claim 1, wherein said second magnetic ring comprises two magnetic tracks.

4. The device of claim 3, wherein each said magnetic track communicates with said at least one magnetic sensor.

5. The device of claim 1, further comprising one single board for receiving sensors communicating with said first and said stator elements and for receiving said at least one magnetic sensor communicating with said second magnetic ring.

6. The device of claim 5, further comprising a housing in which said board is accommodated.

7. The device of claim 5, wherein said stator holder comprises an outer toothing cooperating with a toothed wheel to form a translation gear.

8. The device of claim 7, wherein said toothed wheel has at least one additional magnet.

9. The device of claim 8, further comprising an additional magnetic sensor communicating with said additional magnet.

10. The device of claim 8, wherein said additional magnetic sensor is disposed on said board.

11. The device of claim 7, wherein an axis of said toothed wheel extends parallel or orthogonal to the shaft.

\* \* \* \* \*